(12) United States Patent
Trevor et al.

(10) Patent No.: US 7,752,314 B2
(45) Date of Patent: Jul. 6, 2010

(54) AUTOMATED TAGGING OF SYNDICATION DATA FEEDS

(75) Inventors: Jonathan James Trevor, Santa Clara, CA (US); Pasha Sadri, Menlo Park, CA (US); Edward Ho, San Jose, CA (US); Daniel Joseph Raffel, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 501 days.

(21) Appl. No.: 11/748,837

(22) Filed: May 15, 2007

(65) Prior Publication Data
US 2008/0288640 A1    Nov. 20, 2008

(51) Int. Cl.
G06F 15/173    (2006.01)

(52) U.S. Cl. .................. 709/226; 709/217; 709/218; 715/234

(58) Field of Classification Search ............... None
See application file for complete search history.

(56) References Cited

U.S. PATENT DOCUMENTS

| | | | | |
|---|---|---|---|---|
| 7,454,398 | B2 * | 11/2008 | Kehlenbeck et al. | 725/116 |
| 7,581,166 | B2 * | 8/2009 | Renger et al. | 709/219 |
| 7,590,691 | B2 * | 9/2009 | Gonsalves et al. | 709/223 |
| 7,634,535 | B2 * | 12/2009 | Watson | 709/203 |
| 7,680,882 | B2 * | 3/2010 | Tiu et al. | 709/203 |
| 2005/0289468 | A1 * | 12/2005 | Kahn et al. | 715/738 |
| 2006/0259462 | A1 * | 11/2006 | Timmons | 707/3 |
| 2006/0265489 | A1 * | 11/2006 | Moore | 709/223 |
| 2007/0061711 | A1 * | 3/2007 | Bodin et al. | 715/523 |
| 2007/0124285 | A1 * | 5/2007 | Wright et al. | 707/3 |
| 2009/0172773 | A1 * | 7/2009 | Moore | 726/1 |

OTHER PUBLICATIONS

Nanno, Tomoyuki et al. HTML2RSS: Automatic Generation of RSS feed based on Structure Analysis of HTML Document. Proceedings of the 15th international conference on World Wide Web. May 2006. ACM. 1075-1076.*

* cited by examiner

*Primary Examiner*—Vivek Srivastava
*Assistant Examiner*—Jeffrey R Swearingen
(74) *Attorney, Agent, or Firm*—Weaver Austin Villeneuve and Sampson LLP

(57) ABSTRACT

One aspect is a method of providing information relevant to a query. Syndication data feeds are processed, the syndication data feeds regarding the contents of publisher web pages. The processing of the syndication data feeds includes, for each syndication data feed, causing determination from that syndication data feed of at least one tag to associate with that syndication data feed and causing the at least one tag to be stored in association with an indication of syndication data feed information corresponding to that syndication data feed. The query is received, and the query is processed in view of the stored tags. Based thereon, an indication is provided of syndication data feed information corresponding to at least one syndication data feed.

19 Claims, 3 Drawing Sheets

AUTOMATED TAGGING OF SYNDICATION DATA FEEDS

BACKGROUND

It is known to use "tags" associated with web bookmarks as a tool for sharing web bookmarks among a web community. For example, the del.icio.us bookmarking web service, provided by Yahoo! Inc. of Sunnyvale, Calif., is a web service that allows users to assign keyword tags to their bookmarks (favorite URL's). Facility is provided for other users of the service to browse or search for bookmarks based on the user-assigned keyword tags. In order to tag a bookmark, a user generally chooses from one of an inventory of user-contributed tags.

If a particular URL has not been bookmarked and tagged, then a user of the del.icio.us service will not find it. Furthermore, there may be situations in which user-assigned tags are inaccurate, i.e., are not representative of the content at the URL/bookmark to which the tag has been assigned.

SUMMARY

One aspect is a method of providing information relevant to a query. Syndication data feeds are processed, the syndication data feeds regarding the contents of publisher web pages. The processing of the syndication data feeds includes, for each syndication data feed, causing determination from that syndication data feed of at least one tag to associate with that syndication data feed and causing the at least one tag to be stored in association with an indication of syndication data feed information corresponding to that syndication data feed.

The query is received, and the query is processed in view of the stored tags. Based thereon, an indication is provided of syndication data feed information corresponding to at least one syndication data feed.

DETAILED DESCRIPTION

Figure 1:
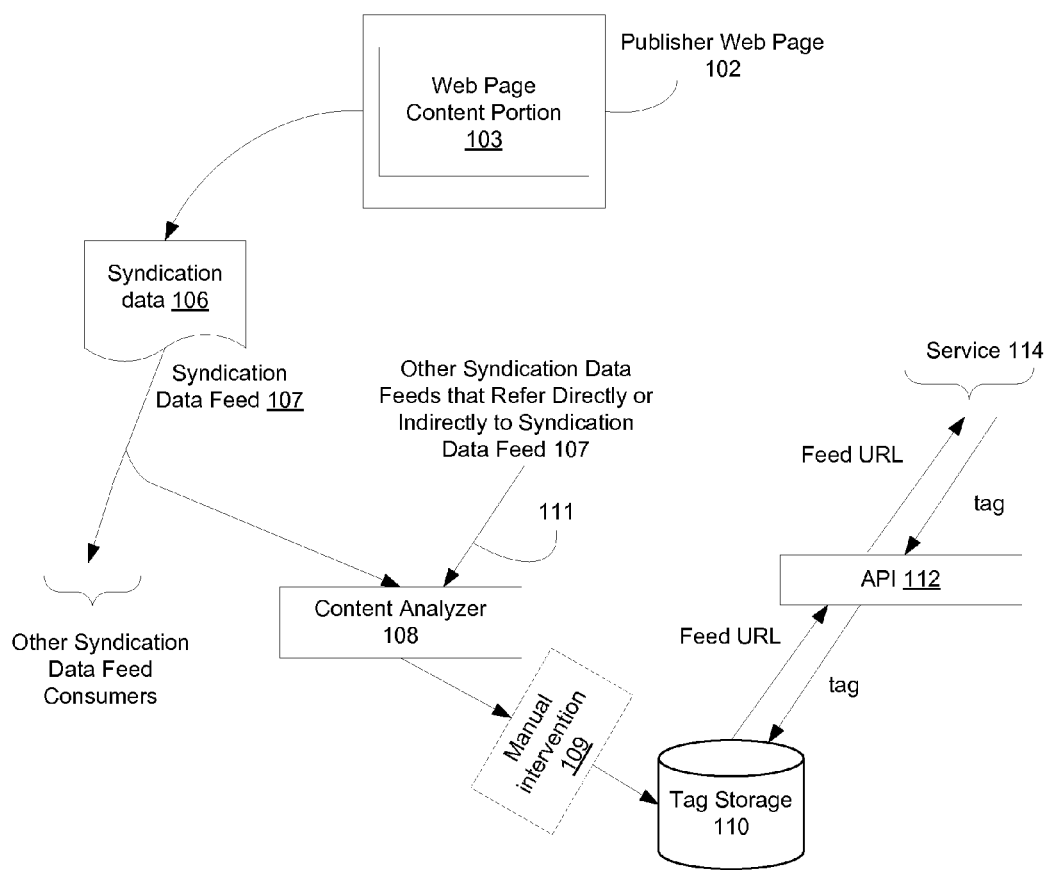
FIG. 1 illustrates the architecture of an example system in which syndication data items regarding the content of a publisher web page may be used to automatically determine tags to associate with the syndication data items and/or with one or more web pages of the publisher web page.

In accordance with an example, syndication data items of a syndication data feed are processed to cause determination therefrom of at least one keyword tag to associate with the syndication data feed and/or with content of one or more publisher web pages to which the syndication data feed items correspond. The at least one tag is stored in association with an indication of the syndication data feed itself and/or of information referred to in the syndication data feed, including the publisher web page information, for example (generically, syndication data feed information). The tag storage may be accessible via, for example, an application program interface. Thus, for example, users may browse or search for syndication data feeds and/or publisher web pages based at least in part on the stored keyword tags.

In general, a syndication data item for a publisher web page is data that represents the content of the web page and may even be identical in content to the content of the web page, but is not itself the content of the web page. The syndication data is available to syndication-aware programs that subscribe to a "feed" of the syndication data. The syndication data is typically designed to be machine-readable for efficient processing (e.g., into human-readable form). For example, the syndication data is typically XML-based or otherwise structured to ensure or enhance the machine-readability. A syndication data feed item for a publisher web page may be provided by the publisher of the web page or, in some cases, the syndication data feed item may be provided by a third party, such as a blogger.

A typical use of syndication data is by an aggregation program, which combines the contents of multiple feeds for display on a single screen or series of screens. Examples of syndication data include data formatted according to standards such as past, current and to-be promulgated versions of RSS and Atom. While RSS and Atom are popular syndication data formatting standards, there are (and, in high probability, will be) other standards for syndication data formatting.

In at least some examples, syndication data 106 is determined and/or generated based on what the author and/or publisher of the web page content considers to be important. This may be done, for example, by an option of the same content management system that may be used to manually or automatically generate the web page content. In accordance with one example, a "self-scraping" method is utilized to generate the syndication data. Thus, for example, scraping tools may process the web page content and extract what the tool deems to be the relevant parts, to include in the syndication data. Some scraping tools use regular expressions or XPath expressions. Other scraping tools process "hints" provided within the web page content, such as <div> or <span> tags, that help the scraping tool to decide what should be included in the syndication data. Alternately, some third parties may "scrape" the web page content and make the resulting syndication data generally available. As yet another alternative (such as the bloggers mentioned above), humans may evaluate the web page content and generate syndication data therefrom.

We now turn to FIG. 1, which illustrates the architecture of a system in which syndication data regarding the content of a publisher web page may be used to determine and store tags to associate with a link to the syndication data feed and/or to the publisher web page. As shown in FIG. 1, a publisher web page 102 (as rendered and displayed) includes at least a publisher web page content portion 103. In addition, as shown in FIG. 1, indicated by reference numeral 107 ("syndication data feed"), the syndication data 106 is made available regarding the publisher web page content 103. As discussed above, as a result of processing by syndication-aware programs, users can, for example, view the syndicated content 106. Furthermore, a program such as a feed reader or aggregator can check a list of feeds on behalf of a user and cause a display based on the syndication data 106 of the syndication data feed 107 and syndication data regarding other publisher web page content. This may include, for example, causing the display of syndication data items regarding any pages and/or articles that are found to have been updated based on the syndication data.

In addition to the syndication data 106 being provided via the syndication data feed 107 for access by syndication-aware programs, a content analyzer 108 analyzes the syndication data 106 by accessing the syndication data feed 107. The analysis by the content analyzer 108 may be, for example, analysis to determine at least one tag to associate with the syndication data feed 106. In addition, the determined at least one tag may be associated with the publisher web page regarding which the syndication data feed 106 has been made available (e.g., a publisher web page, the URL of which is provided in a "link" field of the syndication data feed 106 or in a "link" field of a syndication data item 106 of the syndication data feed 107.

Where the determined at least one tag is associated with the publisher web page regarding which the syndication data feed 106 has been made available, it should be noted that the syndication data 106, typically structured, would generally be more easily processed than the web page content itself. In general, the syndication data (particularly where provided by the publisher of the web page and not by a third party) may be a cleaner representation of the web page content. For example, the syndication data typically does not include the navigation links of the web page.

As also shown in FIG. 1, the content analyzer 108 may analyzer one or more other syndication feeds 111 that refer directly or indirectly to the syndication data feed 106. For example, a syndication data feed item in one of the one or more syndication data feeds 111 may include a link (e.g., URL) pointing to the syndication data feed 107 or to the publisher web page 102 to which the syndication data feed 106 corresponds. The syndication data feed item including that link may also include a description corresponding to that link, and the content of the description may be analyzed by the content analyzer 108 in the process of generating the tags. Furthermore, there may be one or more levels of indirection regarding the syndication data feeds 111, such that content of one or the syndication data feeds 111, that refers to another one of the syndication data feeds 111, that refers to the syndication data feed 107 or to the publisher web page 102, may also be analyzed by the content analyzer 108 in the process of generating the tags.

In some examples, the content analyzer 108 includes a mechanism to establish a weight to associate with the content of the syndication data feed 107 and of the syndication data feeds 111 in the analysis by the content analyzer 108. For example, content of syndication data feeds 111 that less directly link to the syndication data feed 107 may be established to have less weight in the analysis by the content analyzer 107 than content of syndication data feeds 111 that more directly link to the syndication data feed 107. Weight may also (or instead) be established based on authority of a syndication data feed. For example, authority of one of the syndication data feeds 111 may be a function of the number of other sites and/or syndication data feeds that refer to the one syndication data feed (and may even be a function of the authority of those referring sites). Thus, for example, content of syndication data feeds 111 that have fewer sites and/or syndication data feeds referring to them may be established to have less weight in the analysis by the content analyzer 107 than content of syndication data feeds that have more sites and/or syndication data feeds that referring to them.

The determined tag or tags are stored in a tag storage 110 in association with an indication of the corresponding syndication data feed and/or publisher web page. There are a number of ways that the tag storage 110 may be organized. In most examples, the tag storage 110 is organized such that it can be processed to determine, for a particular tag, the indications corresponding to that tag.

Optionally, a manual intervention interface 109 may be provided via which a user may affect what tags are stored in the tag storage 110. For example, the determined tags may be presented on an interactive display of the manual intervention interface and a user given an opportunity to choose the determined tags to be stored in the tag storage 110 and/or supplement the tags to be stored in the tag storage 110.

The tag storage 110 is accessible to one or more services 114 via an application program interface (API) 112. For example, a feed aggregation service may be configured to access the tag storage 110 via the API 112 to cause presentation to a user of syndication data items categorized by a particular tag. As another example, tags can be used in the process of determining advertisements to present in conjunction with the web content with which the tag is associated. As yet another example, tags can be used in the process of determining results of searching for publisher web pages.

Figure 2:
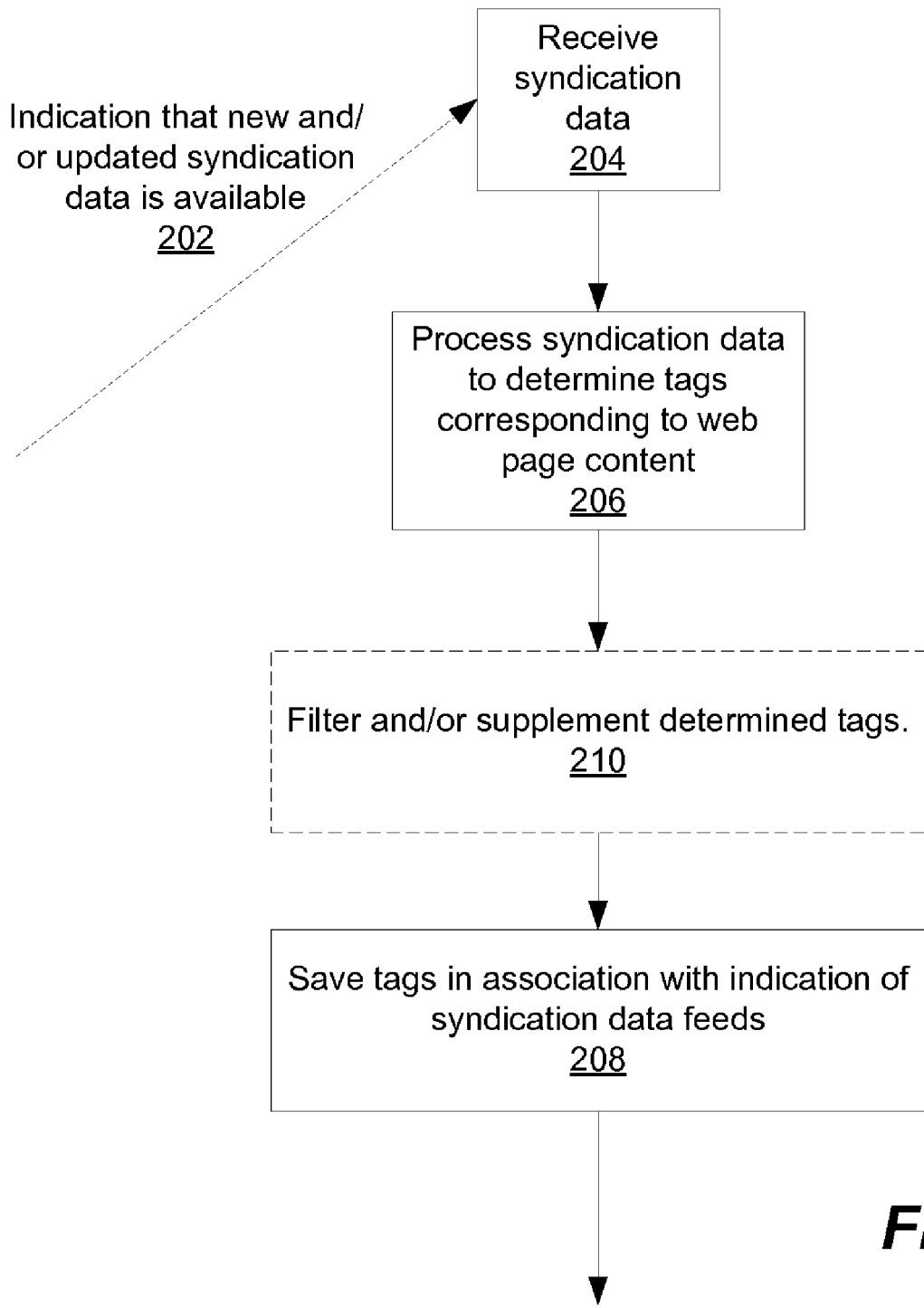
FIG. 2 is a flowchart that broadly illustrates processing to accomplish automatic determination, and storage, of the tags.

Having discussed the architecture illustrated in FIG. 1, we now discuss FIG. 2, which is a flowchart that broadly illustrates an example of processing to accomplish determining the tags to be stored in the tag storage 110. The signal 202 is an indication that new and/or updated syndication data regarding web page content is available. The signal 202 causes processing to go to step 204. It is noted that, in some examples, step 204 may be caused to be executed without regard for such a signal 202.

At step 204, syndication data is received regarding web page content. At step 206, syndication data feed items of the syndication data feed are processed to determine at least one tag to associate with each item of the syndication data feed (and, thus, with the web content to which that syndication data feed item corresponds). For example, the determination processing may include processing to evaluate how important a term of the syndication data item is to the publisher web page, such as based on a frequency with which that term occurs in a corpus of web pages. In one particular implementation, this may include applying a term frequency—inverse document frequency to the term with respect to the corpus of documents.

At step 208, the determined tags are stored in association with an indication of some content. As mentioned above, the determined tags may be stored in association with an indication of the syndication data feed for which they were determined. For example, the indication of the syndication data feed may be a URL (ending in .rss, for example, in a situation where the syndication data feed is according to an RSS protocol) associated with the syndication data feed of which the syndication data feed items were processed. In this case, for example, the determined tags for the syndication data items of a syndication data feed may be stored in aggregation in association with an indication of that syndication data feed.

As also mentioned above, in addition or instead, the determined tags may be stored in association with an indication of the web page content with which a processed syndication data feed or individual syndication data feed item is associated. As also mentioned above, the indication of the web page content may be taken, for example, from a "link" field of a syndication data feed and/or of one or more syndication data items of that syndication data feed.

Optionally, at step 210, the determined tags may be "filtered" by a user by, for example, presenting the determined tags via a user interface and receiving an indication of which of the determined tags to store (or not to store) in association with an indication of the data feed items for which the tags are determined. In some examples, the user interface may even be configured for the user to cause the addition of tags that are not determined tags.

Figure 3:
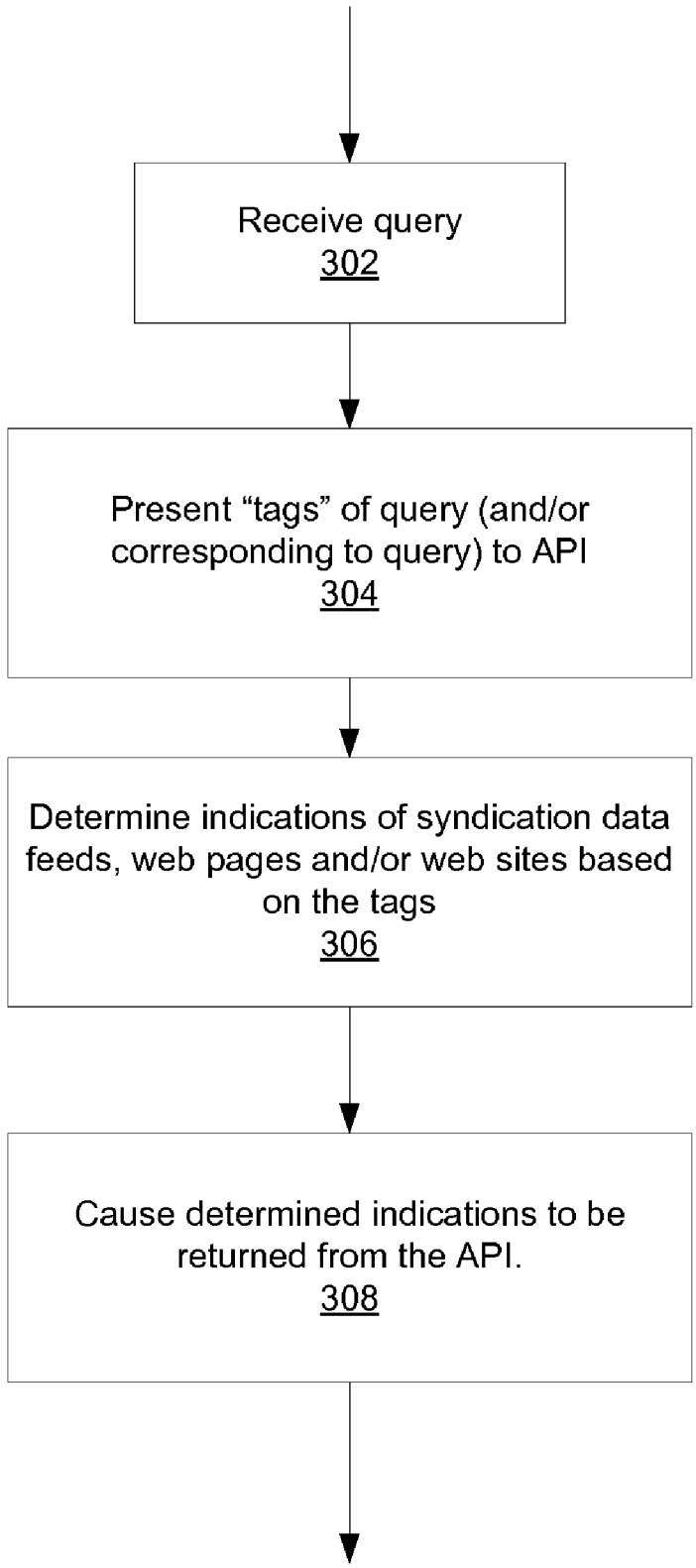
FIG. 3 is a flowchart illustrating an example in which a service utilizes the tag storage to a list of syndication data feed indications and/or a list of web page indications.

FIG. 3 illustrates an example in which a service (in this case, a search service) utilizes the tag storage. In particular, the service receives a query that includes one or more tags or is processed to determine one or more tags (e.g., by using a thesaurus or other processing). The service presents the tags and, based on the tags, the service returns a list of syndication data feed indications (e.g., a list of links). For example, the returned list may be presented in a manner similar to the presentation manner of a feed reader. In a simplistic example, the returned syndication data feed indications are simply those syndication data feed indications in the tag storage that correspond to one or more of the tags presented by the service.

In addition or instead, the service may return a list of web page indications. Again taking a simplistic example, the returned web page indications may be simply those web page indications in the tag storage that correspond to one or more of the tags presented by the service.

Turning now to FIG. 3, at step 302, the tags of a query and/or corresponding to a query are received (e.g., via a user interface). At step 304, the tags are presented to an API. At step 306, appropriate indications of syndication data feed items, and/or indications of web pages and/or web sites, based on the tags are determined. At step 308, the indications of syndication data feed items, web pages and/or web sites are returned from the API.

We have described processing syndication data items of a syndication data feed to cause determination thereof of at least one keyword tag to associate with the syndication data feed and/or with content of one or more publisher web pages to which the syndication data feed items correspond. The tags are usable in the process of browsing or searching for syndication data feeds and/or publisher web pages.

What is claimed is:

1. A method of providing information relevant to a query, comprising:
    processing syndication data feeds providing at least some of the contents of publisher web pages, including, for each syndication data feed,
        determining at least one content tag to associate with that syndication data feed based on a plurality of syndication data feeds which refer to that syndication data feed, the at least one content tag representing subject matter carried by that syndication data feed and being determined based on weights associated with the plurality of syndication data feeds, the determining performed automatically by running a content analyzer on the syndication data feed, and wherein the weights associated with at least some of the plurality of syndication data feeds are based at least in part on an amount of indirection to that syndication data feed or an authority associated with the at least some of the plurality of syndication data feeds; and
        indexing the at least one content tag in association with a syndication data feed indicator in a tag storage location, the syndication data feed indicator indicating a location of content associated with the syndication data feed;
    locating syndication data feed indicators responsive to the query using the indexed content tags in the storage location.

2. The method of claim 1, wherein:
one of the plurality of syndication data feeds which refer to that syndication data feed refers directly to that syndication data feed.

3. The method of claim 1, wherein:
one of the plurality of syndication data feeds which refer to that syndication data feed refers indirectly to that syndication data feed.

4. The method of claim 1, wherein:
determining at least one tag includes determining preliminary tags to associate with the content of the publisher web page and receiving, via a user interface, an indication of particular ones of the determined preliminary tags to associate with the syndication data feed indicator.

5. The method of claim 1, wherein:
processing the syndication data feed further includes processing to evaluate how important a term of the syndication data feed is to the publisher web page.

6. The method of claim 5, wherein:
processing the syndication data feed further includes applying a term frequency-inverse document frequency to the term with respect to a corpus of documents.

7. The method of claim 1, wherein:
processing the syndication data feed further includes processing to evaluate how important a term of the syndication data is to the publisher web page based on a frequency with which that term occurs in a corpus of web pages.

8. The method of claim 1, wherein:
the syndication data feed indicator includes at least one of the group consisting of a location of the syndication data feed and a location of a web page linked to by the syndication data feed.

9. The method of claim 8, wherein:
the location of the web page linked to by the syndication data feed is a location of a web page linked to by a syndication data feed item of the syndication data feed.

10. A method of determining content tags to associate with web page content of a publisher web page, comprising:
    receiving a syndication data item associated with a syndication data feed regarding the content of the publisher web page;
    determining at least one content tag to associate with the content of the publisher web page based on a plurality of syndication data feeds which refer to the syndication data feed, the at least one content tag representing subject matter carried by the syndication data item and being determined based on weights associated with the plurality of syndication data feeds, the determining performed automatically by running a content analyzer on the syndication data item, and wherein the weights associated with at least some of the plurality of syndication data feeds are based at least in part on an amount of indirection to the syndication data feed or an authority associated with the at least some of the plurality of syndication data feeds; and
    indexing the at least one tag in association with an indicator of the syndication data item in a tag storage location, the indicator indicating a location of the content associated with the syndication data item.

11. The method of claim 10, wherein:
determining at least one content tag includes determining preliminary tags to associate with the content of the publisher web page and receiving, via a user interface, an indication of particular ones of the determined preliminary tags to associate with the indicator of the syndication data item.

12. The method of claim 10, wherein:
determining at least one content tag includes processing to evaluate how important a term of the syndication data item is to the publisher web page.

13. The method of claim 12, wherein:
determining at least one content tag includes applying a term frequency-inverse document frequency to the term with respect to a corpus of documents.

14. The method of claim 10, wherein:
determining at least one content tag includes processing to evaluate how important a term of the syndication data feed is to the publisher web page based on a frequency with which that term occurs in a corpus of web pages.

15. The method of claim 10, wherein:
the indicator corresponding to that syndication data item includes at least one of the group consisting of a location of the syndication data feed and a location of a web page linked to by the syndication data feed.

16. The method of claim 15, wherein:
the location of the web page linked to by the syndication data feed is a location of a web page linked to by a syndication data feed item of the syndication data feed.

17. A computer readable medium usable for determining information relevant to a query, the computer readable medium having tangibly embodied thereon data, for each of a plurality of syndication data feeds, at least one content tag associated with that syndication data feed and based on a plurality of syndication data feeds which refer to that syndication data feed, in association with the at least one content tag, an indication of syndication data feed information corresponding to that syndication data feed, wherein the at least one content tag describes content associated with the syndication data feed and was determined based on weights associated with the plurality of syndication data feeds, wherein the weights associated with at least some of the plurality of syndication data feeds are based at least in part on an amount of indirection to that syndication data feed or an authority associated with the at least some of the plurality of syndication data feeds, the data indexed on the computer readable medium to enable a computing device to locate one or more syndication data feeds in the plurality associated with a tag in the query.

18. The computer readable medium of claim 17, wherein the indication of the syndication data feed information corresponding to that syndication data feed includes at least one of the group consisting of an indication of a location of the syndication data feed and an indication of a location of a web page linked to by the syndication data feed.

19. A system including at least one computing device configured to provide information relevant to a query, the at least one computing device configured to:
process syndication data feeds providing at least some of the contents of publisher web pages, including, for each syndication data feed,
determine at least one content tag to associate with that syndication data feed based on a plurality of syndication data feeds which refer to that syndication data feed, the at least one content tag representing subject matter carried by that syndication data feed and being determined based on weights associated with the plurality of syndication data feeds, the determining performed automatically by running a content analyzer on the syndication data feed, and wherein the weights associated with at least some of the plurality of syndication data feeds are based at least in part on an amount of indirection to that syndication data feed or an authority associated with the at least some of the plurality of syndication data feeds; and
index the at least one tag in association with a syndication data feed indicator in a tag storage location, the syndication data feed indicator indicating a location of content associated with the syndication data feed;
locate syndication data feed indicators responsive to the query using the indexed content tags in the storage location.

* * * * *